(12) United States Patent
Parekh et al.

(10) Patent No.: US 9,045,353 B2
(45) Date of Patent: Jun. 2, 2015

(54) FILTERING WATER BOTTLE

(75) Inventors: Jay Kiran Parekh, Philadelphia, PA (US); Aakash Mathur, Philadelphia, PA (US); Arjun Daniel Srinivas, San Francisco, CA (US); Michael Eugene Young, Emeryville, CA (US); Alexander Chow Mittal, Barkeley, CA (US)

(73) Assignees: HYDROS BOTTLE, LLC, San Francisco, CA (US); INNOVA DYNAMICS, INC., San Francisco, CA (US)

( * ) Notice: Subject to any disclaimer, the term of this patent is extended or adjusted under 35 U.S.C. 154(b) by 413 days.

(21) Appl. No.: 13/224,703

(22) Filed: Sep. 2, 2011

(65) Prior Publication Data

US 2012/0055862 A1    Mar. 8, 2012

Related U.S. Application Data

(60) Provisional application No. 61/380,228, filed on Sep. 4, 2010.

(51) Int. Cl.
*C02F 1/28* (2006.01)
*C02F 1/42* (2006.01)
*C02F 1/00* (2006.01)

(52) U.S. Cl.
CPC .............. *C02F 1/002* (2013.01); *C02F 2307/02* (2013.01)

(58) Field of Classification Search
CPC ....... C02F 1/002; C02F 1/283; C02F 2307/02
USPC ......... 210/244, 282, 291, 317, 464, 469, 472, 210/474, 484, 501, 502.1
See application file for complete search history.

(56) References Cited

U.S. PATENT DOCUMENTS

| | | | | | |
|---|---|---|---|---|---|
| 2,224,577 | A | * | 12/1940 | Shively et al. | ................. 210/470 |
| 3,335,917 | A | * | 8/1967 | Knight | ..................... 222/189.07 |
| 4,419,235 | A | * | 12/1983 | Sway | ............................. 210/282 |
| 4,605,499 | A | * | 8/1986 | Wise | ............................ 210/282 |

(Continued)

FOREIGN PATENT DOCUMENTS

| | | |
|---|---|---|
| WO | 2008150867 | 12/2008 |
| WO | 2010022353 | 2/2010 |

OTHER PUBLICATIONS

U.S. Appl. No. 61/126,589, filed May 6, 2008 by Mittal.

(Continued)

*Primary Examiner* — Matthew O Savage
(74) *Attorney, Agent, or Firm* — Knobbe, Martens, Olson & Bear LLP

(57) ABSTRACT

A portable, personal apparatus for treating drinking water comprises a generally tubular or cylindrical filter housing containing filtration media and water-permeable screen or mesh or felt or membrane or netting layer at the top and bottom ends of the filter. The design of the apparatus involves the bottle exterior and interior contouring to the filter and enables the efficient and rapid gravity flow of water in through the filter. The apparatus may be configured such that water is first passed through a top reservoir designed to receive water, followed by a porous mesh, followed by granular filtration and antimicrobial media agitated by turbulent motion of influent water, followed by a porous mesh before reaching a durable and reusable water containment vessel.

27 Claims, 3 Drawing Sheets

(56) References Cited

U.S. PATENT DOCUMENTS

| | | | |
|---|---|---|---|
| 5,238,140 A | | 8/1993 | Maze |
| 5,303,850 A | | 4/1994 | Connan |
| 5,509,551 A | | 4/1996 | Terrell, II |
| 5,609,759 A | | 3/1997 | Nohren, Jr. et al. |
| 5,635,063 A | * | 6/1997 | Rajan et al. .................. 210/266 |
| 5,914,045 A | | 6/1999 | Palmer et al. |
| 6,136,188 A | | 10/2000 | Rajan et al. |
| 6,136,189 A | | 10/2000 | Smith et al. |
| 6,631,744 B1 | | 10/2003 | Gerhart et al. |
| 6,733,669 B1 | | 5/2004 | Crick |
| 8,142,654 B2 | * | 3/2012 | Kohl ............................ 210/244 |
| 2001/0035428 A1 | | 11/2001 | Shipilevsky |
| 2003/0111495 A1 | | 6/2003 | Parve et al. |
| 2006/0163136 A1 | * | 7/2006 | Patil et al. .................... 210/263 |
| 2007/0102332 A1 | | 5/2007 | Bommi et al. |
| 2007/0119772 A1 | | 5/2007 | Hiranaga et al. |
| 2010/0219151 A1 | | 9/2010 | Risheq |
| 2011/0117257 A1 | | 5/2011 | Sturgess |
| 2011/0217544 A1 | | 9/2011 | Young et al. |

OTHER PUBLICATIONS

U.S. Appl. No. 61/189,540, filed Aug. 21, 2008 by Mittal.
U.S. Appl. No. 61/203,661, filed Dec. 26, 2008 by Mittal.
Website: Clear2O (www.clear2o.com) accessed on Sep. 2, 2011.
Webiste: Aquamira (www.aquamira.com) accessed on Sep. 2, 2011.
Website: Seychelle (www.seychelle.com) accessed on Sep. 2, 2011.
Website: Enviro Products (www.newwaveenviro.com) accessed on Sep. 2, 2011.
Website: Fit & Fresh Livpure Bottle (www.fit-fresh.com/products/livpure) accessed on Sep. 2, 2011.
Website: Water Bobble (www.waterbobble.com) accessed on Sep. 2, 2011.
Webiste: Guyot Tapguard (www.guyotdesigns.com) accessed on Sep. 2, 2011.
Website: Pure Hydration Aquapure Travel (www.bwtechnologies.com/aquapure_traveller.html) accessed on Sep. 2, 2011.
Website: 3-2-1 water (www.321-water.com) accessed on Sep. 2, 2011.
International Search Report dated Jan. 22, 2013 from International Application No. PCT/US2012/056642 filed Sep. 21, 2012 in 2 pages.
Ubergizmo, "Binibottle design is revolutionary," Oct. 10, 2007, p. 1 [online] <URL: http://www.ubergizmo.com/2007/10/binibottle-design-is-revolutionary/> [retrieved Dec. 23, 2014].

* cited by examiner

FILTERING WATER BOTTLE

CROSS-REFERENCE TO RELATED APPLICATIONS

This application claims the benefit of U.S. Provisional Patent Application No. 61/380,228 filed Sep. 4, 2010 entitled "Filtering Water Bottle", incorporated by reference herein in its entirety.

BACKGROUND OF THE INVENTION

This invention relates, generally, to water filters and water vessels. More specifically, this invention relates to a reusable water bottle designed with a mounted filtration cartridge.

Point-of-use filters are used in daily life by people across all walks of life in developed and developing countries alike to remove contaminants and improve taste of drinking water. The multibillion bottled water industry created over the past decade claims the majority of Americans as regular consumers, many of which are daily drinkers of bottled water, making bottle water the third most consumed bottled beverage in the country. The top three reasons cited for use are convenience, improved taste, and quality concerns. Despite the popularity of bottled water, consumers are becoming increasingly aware of the incredible cost and environmental damage caused by the industry.

Existing reusable gravity-fed or pitcher filtration systems provide filtered water for consumers but require lengthy filtration times and provide no portability.

BRIEF SUMMARY OF THE INVENTION

In one embodiment, there is a portable, personal apparatus for treating drinking water, comprising: a generally tubular or cylindrical filter housing having a filter containing filtration media that comprises a water-permeable screen or mesh or felt or membrane or netting layer at the top and bottom ends of the filter enabling gravity flow of water through the filter.

In one embodiment there is a portable, personal apparatus for treating drinking water, comprising: a generally tubular or cylindrical filter housing containing filtration media that comprises a water-permeable screen or mesh or felt or membrane or netting layer at the top and bottom ends of the filter enabling rapid gravity flow of water through the filter. In one embodiment, the filter allows for bidirectional flow. In one embodiment, the filter allows for low-pressure drop. In one embodiment, the filter allows for a bottle fill rate of 0.5-5 Lpm through the filter cartridge.

In one embodiment, the apparatus comprises a reservoir at the top entrance of the filter to temporarily hold and funnel influent into the filter. In one embodiment, a cap is placed on top of the filter to prevent water from escaping the unit when sealed. In one embodiment, the cap is sealable. In one embodiment, the apparatus comprises a portable, personal, reusable bottle body serving as a vessel upon which said filter is attached. In one embodiment, the bottle is designed to match the functional, ergonomic curvature of the entire device. In one embodiment, the filter comprises one or more of the following media: adsorbent media, granular activated carbon, KDF-55, KDF-85, brass filings, CuZn, ion exchange media, ion exchange resin, zeolites, activated alumina, mechanical filtration mesh, oxidation media, activated carbon cloth, carbon mesh, carbon screen, carbon padding, carbon fabric, carbon sponge, carbon foam, carbon felt or carbon fiber mat. In one embodiment, the media is homogeneously mixed, separated, compartmentalized, orientated, heterogeneously mixed, or any combination thereof.

In one embodiment, the filter comprises filtration pellets that are incorporated with agents including, but not limited to, antimicrobial agents, biocidal agents, silver, titania, zinc, KDF fines, ion exchange media, zeolites, activated alumina, powdered activated carbon, oxidation media, nanoparticles, microparticles, adsorbing agents, absorbing agents, catalytic agents, or any combination thereof. In one embodiment, said agents are surface-embedded into the said filtration pellets. In one embodiment, at least two filtration media are chosen as to interact with one another and enhance filtration efficacy. In one embodiment, the combination of two or more media are chosen such that rate of contaminant reduction is greater with the combination than that with individual media is not housed in combination. In one embodiment, the phenomena associated with media combinations may be but are not limited to co-precipitation, ion exchange, redox reaction, oxidation, reduction, chelation, flocculation, absorption, adsorption, physical de-mobilization, chemical de-mobilization, or any combination thereof. In one embodiment, at least two filtration media are used in a layered configuration where influent water contacts one filtration media region or compartment prior to another filtration media region or compartment, in a fashion to enhance contaminant reduction and filtration efficacy.

In one embodiment, the filter can reduce at least one contaminant conforming to the NSF/ANSI 42 standard at a given flow rate of 0.1 Lpm-2.1 Lpm. In one embodiment, the filter can reduce at least one contaminant conforming to the NSF/ANSI 42 standard at a given flow rate of 0.1 Lpm-1.0 Lpm. In one embodiment, the filter can reduce at least one contaminant conforming to the NSF/ANSI 42 standard at a given flow rate of 1.0 Lpm-2.0 Lpm. In one embodiment, the filter can reduce at least one contaminant conforming to the NSF/ANSI 42 standard at a given flow rate of 2.0 Lpm-3.0 Lpm. In one embodiment, the filter can reduce at least one contaminant conforming to the NSF/ANSI 42 standard at a given flow rate of 3.0 Lpm-5.0 Lpm. In one embodiment, the filter can reduce at least one contaminant conforming to the NSF/ANSI 42 standard at a given flow rate of 0.1 Lpm-5.0 Lpm. In one embodiment, the filter can reduce at least one contaminant conforming to the NSF/ANSI 42 standard at a flow rate greater than 5.0 Lpm. In one embodiment, the filter can reduce at least one contaminant conforming to the NSF/ANSI 53 standard at a given flow rate of 0.1 Lpm-2.1 Lpm. In one embodiment, the filter can reduce at least one contaminant conforming to the NSF/ANSI 53 standard at a given flow rate of 0.1 Lpm-1.0 Lpm. In one embodiment, the filter can reduce at least one contaminant conforming to the NSF/ANSI 53 standard at a given flow rate of 1.0 Lpm-2.0 Lpm. In one embodiment, the filter can reduce at least one contaminant conforming to the NSF/ANSI 53 standard at a given flow rate of 2.0 Lpm-3.0 Lpm. In one embodiment, the filter can reduce at least one contaminant conforming to the NSF/ANSI 53 standard at a given flow rate of 3.0 Lpm-5.0 Lpm. In one embodiment, the filter can reduce at least one contaminant conforming to the NSF/ANSI 53 standard at a given flow rate of 0.1 Lpm-5.0 Lpm. In one embodiment, the filter can reduce at least one contaminant conforming to the NSF/ANSI 53 standard at a flow rate greater than 5.0 Lpm.

In one embodiment, the filter comprises a means to reduce at least one of the following: contaminants, organic compounds, inorganic compounds, chloramines, chlorine, particulates, turbidity, arsenic, lead, cadmium, chromium, copper, formazin, pesticides, atrazine, volatile organic compounds, hormones, endocrine disruptors, heavy metals, or the like from drinking water. In one embodiment, the filter reduces contaminates at a given flow rate of 0.1-2.1 Lpm. In one embodiment, the various material enclosure(s) of the components of the disclosed invention comprise one or more of the following: metal, thermoplastic, thermoset, bioplastic, biopolymer, Eastman Tritan® Copolyester, polymethylmethacrylate (PMMA), acrylic, polylactic acid (PLA), polyglycolic acid (PGA), polypropylene (PP), polystyrene (PS), high-impact polystyrene (HIPS), styrene acrylonitrile (SAN), polyethylene (PE), low-density polyethylene (LDPE), high density polyethylene (HDPE), polycarbonate (PC), BPA-free polycarbonate (PC), polyethylene terephthalate (PET), polyacrylonitrile butadiene styrene (ABS), polyester, polydimethylsiloxane (PDMS), polysulfone (PES), polysulphone (PSU), polyurethane (PU), polyvinyl chloride (PVC), stainless steel, glass, silica, ceramic, metal, metal oxide, bio-derived polyethylene, cellulose acetate, cellulose acetate butryrate, cellulose proprionate, ECM biofilm, PHB biocomposite, plastarch, or any copolymer or combination thereof. In one embodiment, the apparatus may comprise in addition a filter bag with filtration media contained therein. In one embodiment, the apparatus may additionally comprise antimicrobial components. In one embodiment, the apparatus may additionally comprise visual indicators of device performance. In one embodiment, the apparatus may additionally comprise a straw. In one embodiment, the apparatus may additionally comprise a filter "puck" or activated carbon block. In one embodiment the filter "puck" or activated carbon block may be most effective when paired with a shaking or agitation action. In one embodiment, the apparatus may additionally comprise one or more filtration chambers. In one embodiment, the apparatus may additionally comprise a secondary bottle opening. In one embodiment, the apparatus may additionally comprise a sachet filtration system. In another embodiment, the apparatus may comprise a filter press, wherein there is uncontained filtration media which can be contained by pressing the filter press, thereby, preventing the filter media from exiting the bottle or being ingested; conceptually this is similar to a French press coffee maker, but instead of coffee grounds, there would be filtration media.

In another embodiment, there is a portable, reusable apparatus for treating drinking water, comprising: a bottle having a mouth; a filter housing including a water filter and a reservoir, the filter housing configured to be removeably and scalingly attached to the mouth of the bottle; and a cap configured to sealingly close the reservoir of the filter housing. In one embodiment, the filter housing and the bottle are threadably attached. In one embodiment, the cap and the filter housing are threadably attached. In one embodiment, the filter is configured to filter water entering and exiting the bottle when the filter housing is attached to the bottle.

In another embodiment, there is a portable, reusable apparatus for treating drinking water, comprising: a generally cylindrical bottle having a mouth; a generally cylindrical filter housing including a water filter and a reservoir, the filter housing configured to be threadably attached to the mouth of the bottle, the water filter being configured to reduce at least one contaminant conforming to the NSF/ANSI 42 standard as water passes through the water filer and into the bottle at a flow rate of at least 0.8 Lpm; and a cap configured to threadably close the reservoir of the filter housing.

BRIEF DESCRIPTION OF THE SEVERAL VIEWS OF THE DRAWINGS

The foregoing summary, as well as the following detailed description of embodiments of the filtering water bottle, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 1:
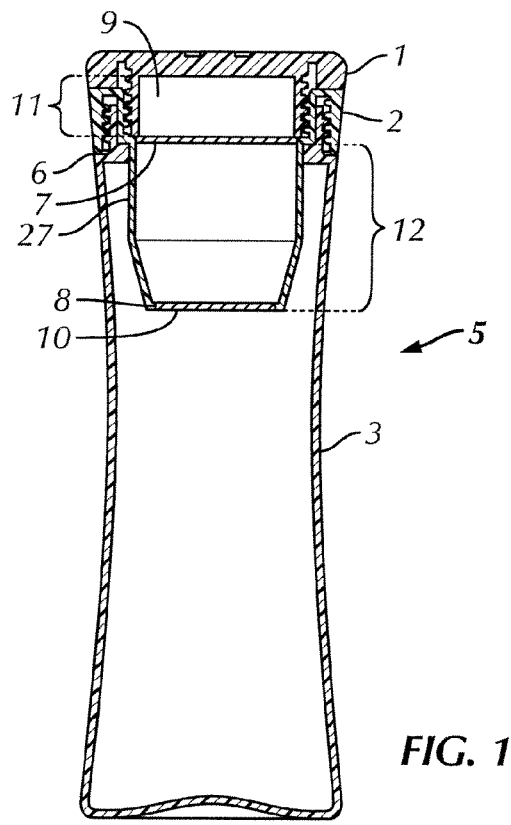
FIG. 1 is a side cross-sectional view of a filtering water bottle in accordance with an exemplary embodiment of the present invention.

With perception of the quality of tap water being low and acceptance of water filtration being high (based on popularity of use home filtration units), people are looking for an improved mobile point-of-use filtration system.

Known reusable filtering water bottles are inconvenient, complicated, expensive, and only filter water as the water is departing the bottle through the filter, in other words, they only filter water on the way out of the bottle. These designs force users to adapt their way of drinking water from their bottle; for example, users have to strenuously squeeze the bottle to force water through the filter and into their mouth, strenuously suck water out of the filter, etc.

Gravity flow filtration systems known in the art include primarily pour-through carafes or pitchers and refrigerator water tanks developed by Clorox (BRITA®), Culligan™, Rubbermaid™, and Glacier Pure™. Some of the drawbacks of leading pitcher filters include weak acid cation exchange resins needing long contact times and large resin volumes (typically 65% of the volume of the filter) to work effectively. Also, excessive voids or channeling may form between granules thereby degrading the effect of the filters. Additionally, some filtering pitchers and refrigerator water tanks are not portable and are not configured for a user to drink directly from the container.

In some embodiments, the filtering water bottle of the present invention is configured to filter water as it is added to the bottle. In one embodiment, the filtering water bottle of the present invention includes a 1) fast flowing gravity percolation filtration unit and a 2) reusable bottle with an open top end having a means of securing said filter wherein the bottle is configured to filter water on its way into the bottle via gravity. In one embodiment, the filter is bi-directional to allow filtering in and out of the bottle. In a preferred, non-limiting embodiment, the filter assembly may be a cylindrical housing comprising one or more filtration elements, including, but not limited to, coarse media, such as activated carbon, and antimicrobial pellets designed to increase flow rate of liquid through the cylindrical housing while also helping to prevent bacterial growth in the filter. In a preferred non-limiting embodiment, the filtration media may be contained in the filter assembly itself. In another preferred non-limiting embodiment, the filtration media may be contained in a replaceable cartridge that fits into the filter assembly. Characteristic dimensions of the coarse media ranges may range in diameter from 1.5 mm to 5 mm.

In a preferred non-limiting embodiment, water enters the filter assembly through the entrance at the top, enters an overflow reservoir, passes into a cylindrical unit housing filter media, and exits through said cylindrical unit through the open end of the filter housing into the body of the plastic bottle. The entrance of the filter assembly may contain features to accommodate a cap, by screw threads or interference fit. The entrance of the cylindrical unit may be positioned below a reservoir designed to catch excess outflow from the source. The entrance of the cylindrical filter may be covered with a porous material with pores greater than or equal to 400 microns to permit the expulsion of air from within the filter assembly. The exit of the filter may be covered with another porous material for containment of the coarse filter media. Preferred porous materials may have high wettability for reduced surface tension and higher filtration and flow rates. The filter encasing may have one or more ventilation hole(s) positioned and configured to vent air from inside the bottle chamber to outside the filter assembly as water displaces air inside the bottle during bottle filling. The filter assembly may be attached to the bottle at the open end by screw threads or interference fit. In one embodiment, the user removes the filter and drinks from the bottle. In one embodiment, the user drinks the water coming back through the filter. In a preferred non-limiting embodiment, the bottle unit is characterized by a distinctive shape of two symmetric parabolas with radius between 10 inches to 50 inches, with the outer geometry of all parts (i.e., cap, filter, etc.) designed to continue the parabolic curve seamlessly.

In describing the non-limiting embodiments of the present invention, the following terms may be employed:

"Activated carbon": Includes, in some embodiments, highly porous and high adsorption surface area having a random or amorphous structure, comprising, without limitation, carbon derived from coconut shells, coconut coir, corn husk, polyacrylonitrile polymer, charred cellulosic fibers, wood, coal, bituminous coal, agricultural waste, cellulosic materials, leaves, bamboo, or the like.

"Bi-directional": In some embodiments, refers to the ability of the filtration unit to have water flow from the top through to the bottom portions or alternatively from the bottom through to the top. A preferred, though non-limiting, mode of use of the present invention is to filter water flowing from the top through to the bottom and into the water bottle body, although the user may also have the option of (re) filtering water from the water bottle body entering through the bottom of the filter unit through to the top of the filter unit.

"Filtration": Includes, in some embodiments, various types of processing and media that effectively remove metals, chemicals, elements, organic molecules, microorganisms, or other contaminants in liquid. "Filtration" may also include the addition of chemicals, flavorings, antimicrobial agents, ions, or other liquid treatments.

"Filtration media": Includes, in some embodiments, any material, substance, or combination of materials that may be useful for controlling the filtration performance of a device when water comes into contact with said materials. Filtration media as used herein may include adsorbent media, granular activated carbon, KDF-55, KDF-85, brass filings, CuZn, ion exchange media, ion exchange resin, zeolites, activated alumina, mechanical filtration mesh, oxidation media, activated carbon cloth, carbon mesh, carbon screen, carbon padding, carbon fabric, carbon sponge, carbon foam, carbon felt, carbon fiber mat, functionalized polymer or the like.

Referring to the drawings in detail, wherein like reference numerals indicate like elements throughout, there is shown in FIGS. 1-9 a filtering water bottle, generally designated 5, in accordance with an exemplary embodiment of the present invention.

Referring to FIG. 1, in one embodiment, filtering water bottle 5 is for use in filtering water as it enters filtering water bottle 5, therefore providing filtered water from filtering water bottle 5 during the dispensing action. In one embodiment, filtering water bottle 5, includes a filter 2 attached proximate an opening of a bottle 3. In one embodiment (illustrated in FIG. 2), filter 2 includes filter media 4. In one embodiment, bottle 3 includes a neck 6 as the opening or orifice through which water enters bottle 3 from a filter 2 and where liquid is dispensed from bottle 3. In one embodiment, bottle 3 is ergonomically shaped. In one embodiment, bottle 3 is reusable.

Figure 2:
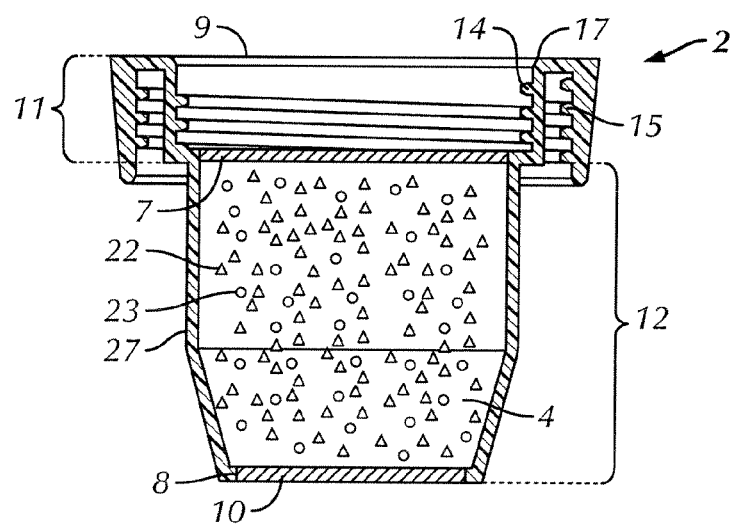
FIG. 2 is a side cross-sectional view of a filtering mechanism of the filtering water bottle illustrated in FIG. 1 with a schematic illustration of the filtering media.
Figure 3:
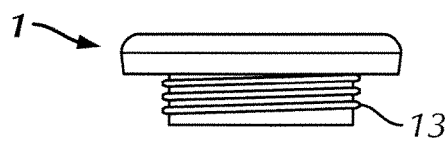
FIG. 3 is a side elevational view of a cap of the filtering water bottle illustrated in FIG. 1.
Figure 4:
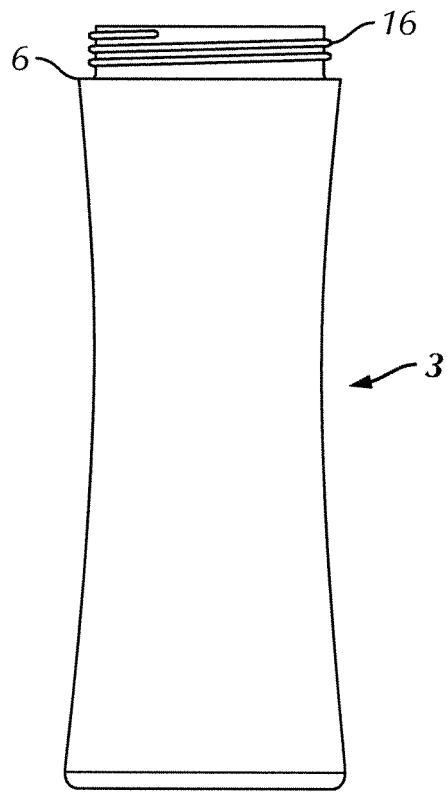
FIG. 4 is a side elevational view of a bottle of the filtering water bottle illustrated in FIG. 1.

In some embodiments, filter 2 is removeably attached to bottle 3. In other embodiments, filter 2 is fixably attached to bottle 3. In one embodiment, filter 2 includes a housing 27, a distal or first end 9, and a proximal or second opposite end, 10. With reference to FIG. 2, in one embodiment, at first end 9, a hollow space or reservoir 11 exists to provide a reservoir for liquid to collect prior to the filtering action. In one embodiment, filter housing 27 is comprised of a rigid material. The shape, width and length of filter 2 may depend on the shape and size of bottle 3. In some embodiments, housing 27 has an outside diameter (circular configuration is preferred but not essential) of 1-3 inches near first end 9 and 0.25-3 inches near second opposite end 10, and dimensioned to fit through neck 6 (see FIG. 1). In one embodiment, the length of filter 2, i.e. the distance between end 9 and end 10, is between 1 and 8 inches.

In some embodiments, disposed adjacent first end 9 is a cap 1. In one embodiment, cap 1 attaches to filter 2 to close reservoir 11. In one embodiment, cap 1 is comprised of a rigid material configured to screw into filter 2. Alternatively, in other embodiments, instead of a screw-on cap, cap 1 may attach to filter 2 using a bayonet fit, snap fit, interference fit, or as another suitable manner. As described further below, cap 1 may include a sealable drinking straw or port.

Referring to FIG. 2, in one embodiment, the hollow interior of filter 2 is divided into two parts. In one embodiment, adjacent to first end 9 is reservoir 11 that is substantially open when cap 1 is open to hold any liquid backed up or upstream from filter 2 when in operation. In one embodiment, reservoir 11 continues to retain water upstream from filter 2 when cap 1 is closed. In one embodiment, filter 2 is removed from bottle 3 before drinking from bottle 3. In some embodiments, filtering water bottle 5 may be turned end over end such that the water makes multiple passes through filter 2 in two directions based on the perceived contaminants in the source water. In some embodiments, filter 2 may be configured to attach to bottle 3 in either filtering direction such that after filtering water into bottle 3 in one direction, filter 2 may be inverted with respect to bottle 3, allowing the user to filter the water a second time through filter 2 in the same direction through filter 2 while drinking from bottle 3. In one embodiment, reservoir 11 is a fraction of the volume of bottle 3. In other embodiments, reservoir 11 is approximately equal to the volume of bottle 3.

In one embodiment, the second part of filter 2, below reservoir 11, is a chamber 12 that contains filtering elements or media 4. In one embodiment, between reservoir 11 and chamber 12 is a divider 7 comprised of a porous material designed to retain filtering media 4 but allow water to enter chamber 12 substantially unhindered. In one embodiment, divider 7 is configured to allow air trapped within chamber 12 to vent and escape outside filter 2. Divider 7 may be removable or fixed in place between reservoir 11 and chamber 12 by any number of methods including insert molding, interference fit, snap fit, sonic welding, spin welding, or heat welding. In one embodiment, second end 10 includes an opening covered with a porous pad 8 designed to retain filter 2 and allow water to exit chamber 12 substantially unhindered. Pad 8 may be removable or fixed in place to second end 10 by any number of methods including insert molding, interference fit, snap fit, sonic welding, spin welding, or heat welding.

Filter media 4 contained within chamber 12 may comprise a wide variety of configurations and made of a wide variety of materials. In some embodiments, a preferred material for at least a part of the filter element is activated carbon, which may be in the form of powder, granules, spheres, sheets, tubes, cloth, mesh, screen, padding, fabric, sponge, foam, felt, et cetera. In some embodiments, media 4 includes activated carbon 22 that is in granular form. In some embodiments, another preferred material for at least a part of the filter element is filtration pellets 23. In one embodiment, filtration pellets 23 are pellets (between approximately 1 mm and approximately 5 mm in diameter) surface-embedded with particles. In one embodiment, such particles have a composition as disclosed by Innova Dynamics, Inc. (formerly Innova Materials, LLC) in International PCT Patent Applications WO/2008/150867 and WO/2010/022353, and U.S. Provisional Patent Applications 61/126,589, 61/189,540, and 61/203,661 all of which are hereby incorporated by reference in their entirety. In one embodiment, the surface enhancement can be used to impart characteristics to filtration pellets 23 that include antimicrobial, filtration, ion exchange, adsorbent, flavor, fragrance, deodorizing, nutrient, and/or water-softening properties. In one embodiment, filtration pellets 23 are surface-embedded with one or more of the following non-limiting ingredients: antimicrobials, biocides, silver, silver-based glass, titania, zinc, KDF, CuZn alloy, ions, ion exchange media, zeolites, activated alumina, powdered activated carbon, oxidation media or the like.

It should be understood that activated carbon is only one form that the filter element can take. Alternatively, the filter element may include an ion exchange media, absorbent media, adsorbent media, KDF-55, KDF-85, brass filings, CuZn, ion exchange resin, zeolites, activated alumina, mechanical filtration mesh, oxidation media, carbon fabric, carbon cloth, membranes, catalysts, or any combination thereof.

Figure 7:
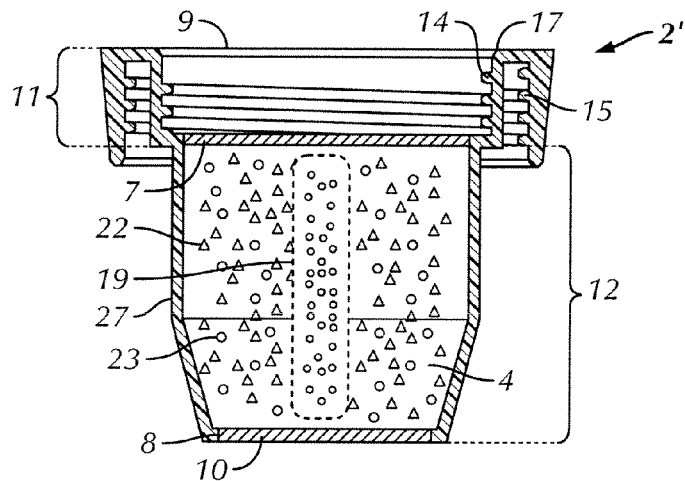
FIG. 7 is a side cross-sectional view of the filtering mechanism of the filtering water bottle illustrated in FIG. 1 showing an alternative construction of the filtering mechanism shown in FIG. 2.
Figure 9:
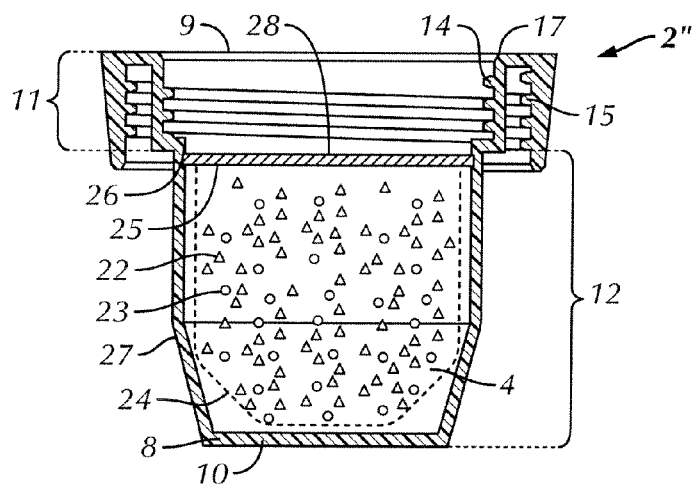
FIG. 9 is aside cross-sectional view of the filtering mechanism of the filtering water bottle illustrated in FIG. 1 showing an alternative schematic construction of the filtering mechanism which utilizes a removable filter bag which contains the filtering media.

In one embodiment, filter 2 is attached to bottle 3 near neck 6 using any number of fits including interference, snap-on, screw thread, bayonet, amongst others. In some embodiments such as shown in FIGS. 2, 7, and 9, filter 2 is attached to bottle 3 using screw threads. In one embodiment, there is male threading 16 on neck 6 that matches the female threading 15 on filter 2. In one embodiment, cap 1 is attached to filter 2 using male threading 13 that match with second female threading 14 on filter 2.

Figure 5:
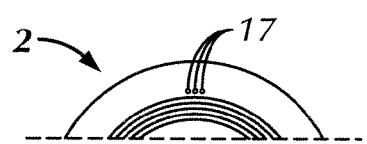
FIG. 5 is a partial top plan view of the filter mechanism illustrated in FIG. 2 showing a ventilation mechanism.

In one embodiment, filtering water bottle 5 is configured to allow air to vent through filter 2 to help speed up filtration. In some embodiments, vents are provided in filter 2 for additional ventilation. Referring to FIG. 5, in one embodiment, filtering water bottle 5 includes one or more ventilation holes 17. In one embodiment, ventilation holes 17 are configured to allow air inside of bottle 3 to vent outside of bottle 3 as water poured through filter 2 enters bottle 3. In alternative embodiments, some other type of vent may be provided to allow air to pass out of bottle 3. For example, a straw drinking mechanism may provide a conduit for air displaced by filtered water entering bottle 3.

Figure 6:
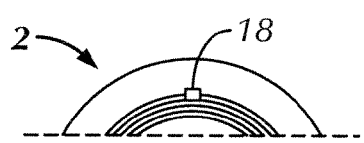
FIG. 6 is a partial top plan view of the filter mechanism illustrated in FIG. 2 showing an alternative construction of a ventilation mechanism.

Referring to FIG. 6, in addition to or instead of a plurality of holes, filtering water bottle 5 may include a single ventilation hole 18. In some embodiments, ventilation holes 17, 18 are sealable to prevent water from spilling from bottle 3. For example, cap 1 may removeably seal off ventilation holes 17, 18 when bottle 3 is not in use for filtration. In one embodiment, filtering water bottle 5 includes a designated drinking location such as for example a spout, indented area and/or indicia. In one embodiment, ventilation holes 17, 18 are spaced, such as being diametrically opposed, from the drinking area to reduce the potential for spilling water from bottle 3 during use.

FIGS. 7 and 9 show alternative non-limiting embodiments of the filter elements. Referring to FIG. 7, in one embodiment, filter 2' includes activated carbon 22 and filtration pellets 23 as described in the embodiments above but in addition to these filter media 4, there exists a sachet 19 of high performance filtration media 21.

Figure 8:
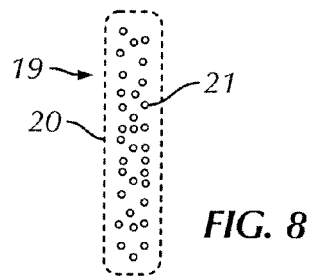
FIG. 8 is a side elevational schematic view of a sachet filled with high performance filtration media that may be utilized with the filtering mechanism as shown, for example, in FIG. 7.

Referring to FIG. 8, sachet 19, in one embodiment, includes a porous mesh 20 designed to let water pass in and out without obstructing flow. In one embodiment, the pore size of the mesh is designed to keep high performance filtration media 21 contained. In this context, high performance filtration media 21 may include, for example, ion exchange media, adsorbent media, KDF-55, KDF-85, brass filings, CuZn, ion exchange resins, zeolites, activated alumina, mechanical filtration mesh, oxidation media or the like.

Referring to FIG. 9, in one embodiment, all of filtration media 4, such as activated carbon 22 and filtration pellets 23, is contained within a filter bag 24 of the filter 2". In one embodiment, filter bag 24 is made out of a porous and flexible mesh material designed to pass water without restricting its flow. In one embodiment, filter bag 24 is configured to contain all filtration media 4 within it and not let any fragments pass downstream. In one embodiment, filter bag 24 has a filter screen 25 secured into open end 28. In one embodiment, filter screen 25 may be secured to the filter bag 24 by various techniques including interference fit, snap fit, adhesive, sonic welding, spin welding, or heat welding. In one embodiment, filter bag 24 is inserted into filter housing 27 and may be secured in place by various mechanisms. One such mechanism is to scat filter screen 25 into a groove 26 designed to hold it in place non-permanently. If needed, filter bag 24, in one embodiment, can be removed and replaced when the filter elements become saturated.

Embodiments of the present invention may include various components that are described in further detail below.

Portable Filter

In some embodiments, the present invention is designed to provide rapid point-of-use filtration and/or purification of liquid in a portable form-factor.

Fast Flowing Filter

In one embodiment, filter 2 is configured and dimensioned to allow air to vent through the filter itself. In some embodiments, filter 2 allows air to vent through the filter while achieving a flow rate of approximately 1 Liters per minute (Lpm) to approximately 10 Lpm. In one embodiment, the flow-rate through filter 2 is greater than approximately 0.1 Lpm. In one embodiment, the flow-rate through filter 2 is greater than approximately 0.2 Lpm. In one embodiment, the flow-rate through filter 2 is greater than approximately 0.3 Lpm. In one embodiment, the flow-rate through filter 2 is greater than approximately 0.4 Lpm. In one embodiment, the flow-rate through filter 2 is greater than approximately 0.5 Lpm. In one embodiment, the flow-rate through filter 2 is greater than approximately 0.6 Lpm. In one embodiment, the flow-rate through filter 2 is greater than approximately 0.7 Lpm. In one embodiment, the flow-rate through filter 2 is greater than approximately 0.75 Lpm. In one embodiment, the flow-rate through filter 2 is greater than approximately 0.8 Lpm. In one embodiment, the flow-rate through filter 2 is greater than approximately 0.9 Lpm. In one embodiment, the flow-rate through filter 2 is greater than approximately 1 Lpm. In one embodiment, the flow-rate through filter 2 is greater than approximately 2 Lpm. In one embodiment, the flow-rate through filter 2 is greater than approximately 3 Lpm. In one embodiment, the flow-rate through filter 2 is greater than approximately 4 Lpm. In one embodiment, the flow-rate through filter 2 is greater than approximately 5 Lpm. In one embodiment, the flow-rate through filter 2 is greater than approximately 6 Lpm. In one embodiment, the flow-rate through filter 2 is greater than approximately 7 Lpm. In one embodiment, the flow-rate through filter 2 is greater than approximately 8 Lpm. In one embodiment, the flow-rate through filter 2 is greater than approximately 9 Lpm. In one embodiment, the flow-rate through filter 2 is greater than approximately 10 Lpm. In one embodiment, the flow-rate through filter 2 is approximately 1.9 Lpm to approximately 2.3 Lpm. In some embodiments, flow rates are achieved without causing the hindrance in flow resulting from a vacuum or pocket of air being trapped within the filter. Filter 2 may also contain ventilation pores, channels, or holes 17, 18 that pass through the plastic housing and allow air inside bottle 3 to vent when liquid flows into bottle 3 and displaces air.

In one embodiment, filter 2 is an in-bound filter. In one embodiment, water enters filter 2 and then passes the open end of the bottle (mouth) 9 into the chamber of bottle 3 by the force of gravity. In some embodiments, the filtering cartridge or the entire filtering portion 2 is replaceable.

In use, a user would remove cap 1 and fill the container through filter 2, resulting in bottle 3 being filled with filtered water. With cap 1 back in place, the user may remove the cap 1 and filter assembly 2 in order to drink the water straight from bottle 3. In a preferred, non-limiting, embodiment, bottle 3 would comprise a wide-mouth opening.

In a non-limiting embodiment, the entrance of filter 2, where the influent water is poured in, would comprise a small reservoir 11 which could temporarily hold water and direct it to flow through filter 2. If the influent flow rate is higher than the effluent flow rate, then reservoir 11 would begin to fill with source water. In another non-limiting embodiment, reservoir 11 is configured to include an overflow feature, that is configured to allow excess influent to pour over the side of the filter and the side of bottle 3 so that is does not interfere with the filtering or enter ventilation holes 17, 18.

Modular Filter Assembly

In one embodiment, filtering water bottle 5, includes separate cap and filter components. Cap 1 allows for filter 2 to be exposed in order to filter water and fill bottle 3. Once filtration is completed and cap 1 is replaced, this assembly allows cap 1 and filter 2 to be unscrewed as one piece, allowing one to drink directly from the mouth of bottle 3 without the filtering water going back through filtering media 4. Cap 1 may also include, but not limited to, a feature to expose a drinking spout without requiring the unscrewing of cap 1. This drinking spout may be an opening with an air vent or a straw-like device, amongst other things. This spout may also be built into a separate rotating disc that turns 10 degrees to 30 degrees to reveal a drinking port.

Bi-Directional Filter

In some embodiments, filter 2 is configured to filter water as bottle 3 is filled and while the water is being drunk from bottle 3. In one embodiment, filtering water bottle 5 is configured to filter water flowing from the top through to the bottom and into bottle 3 and then the user removes filter 2 before drinking. In alternative embodiments, filtering water bottle 5 is configured to allow filtering and/or re-filtering water from bottle 3 entering through the bottom of the filter unit through to the top of the filter unit. In one embodiment with bi-directional filtering, the user may turn filtering water bottle 5 end over end like an hour glass to run the water through filter media 4 two or more times.

Granular Filtration Elements

In one embodiment, filter 2 uses 4×8 and 8×12 mesh size granular activated carbon that reduces chlorine, chloramines, particulates, and volatile organic compounds. In one embodiment, filter 2 includes pellet filtration media, such as polymer pellets (from approximately 1 mm to approximately 5 mm in diameter) embedded on the surface with antimicrobial agents. In one embodiment, plastic resin pellets are surface embedded with filtering agents that actively sequester contaminants present in the exposed liquid. In one embodiment the filtering agents have a composition as disclosed in PCT Patent Applications WO/2008/150867 and WO/2010/022353, and U.S. Provisional Patent Applications 61/126,589, 61/189,540, and 61/203,661.

In one embodiment, filtering water bottle 5 may include 4×8, 6×12, 8×16, 8×30 or 12×30 granular or powder activated carbon with ion exchange resin and other adsorbents and media, that facilitates rapid flow rates of about 0.5 Lpm to about 5 Lpm with a gravity or pour-through setup.

Filter Pad

In one embodiment, filter pad 8 is included with porosity ranging from approximately 50 um to approximately 500 um to cover the bottom opening of filter housing 27. In one embodiment, filter pad 8 reduces surface tension of water flowing out of filter 2, improving flow characteristics. In one embodiment, filter pad 8 retains any filtration media while allowing any ash content contained within carbon media to pass through without restricting flow rate. In a non-limiting embodiment, filter pad 8 may be sonically welded onto the bottom cross member of the filter housing in order to prevent any media leakage. In another non-limiting embodiment, filter pad 8 may be insert injection molded into the filter housing in order to prevent any media leakage and simplify the manufacturing process.

Venting Mesh

In one embodiment, top opening of filter housing 27 is covered by a mesh with porosity from approximately 50 um to approximately 2000 um, to allow air within the filter to escape during filtration. The mesh can cover the filter opening by various methods such as insert injection molding, interference fit, sonic welding, heat welding, spin welding, or adhesive.

Filter Bag

In one embodiment, at least part of filter media 4 may be contained within a separate filter bag 24 that may comprise a rigid ring sewn into a mesh bag 20/24 with a porosity of approximately 100 um to approximately 1000 um. In one embodiment, the opening encircled by a rigid ring is covered by a venting mesh, similar to the one described above. In one embodiment, this venting mesh can be affixed to the filter bag assembly by various methods such as insert injection molding, interference fit, sonic welding, heat sealing, or adhesive. In one embodiment, filter bag 20/24 is configured to fit into filter housing 27. In one embodiment, filter bag 24 locks into a lip feature inside chamber 12. A cap may be provided that is configured to seal on another lip above the position of filter bag 24, ensuring that it is always in the correct position.

Antimicrobial Components

In one embodiment, filter housing 27, cap 1, bottle 3 and all other components that contact the drinking water are enhanced with an antimicrobial agent that keeps bacteria from growing on these parts and in areas exposed to enhanced surfaces, such as the filtration media and the bottle lip, in order to prevent bacterial growth typical in reusable water bottles which usually result in foul odor. Antimicrobial ingredients may be bulk-incorporated into polymer material, deposited via a coating comprising a secondary layer with binder, or surface-embedded. In one embodiment, the coating includes a composition and/or manufacturing method as disclosed by Innova Dynamics, Inc. (formerly Innova Materials, LLC) in PCT Patent Applications WO/2008/150867 and WO/2010/022353, and U.S. Provisional Patent Applications 61/126,589, 61/189,540, and 61/203,661.

Bottle Body

In one embodiment, the outer geometry or contour of bottle 3 is a concave parabola rotated about an axis of symmetry. In such an embodiment, the cross section (see FIG. 1) includes two symmetric inwardly concaved parabolas. In one embodiment, the parabola shape has a radius of approximately 10 inches to approximately 50 inches. In one embodiment, the outer geometry or contour of all parts (e.g., cap 1 and filter housing 27) is configured to continue the parabolic curve of bottle 3 continuously and seamlessly. In some embodiment, bottle 3 may include any ergonomic shape such as having a hand shaped indent. The bottle size and curve geometry may all be designed ergonomically in order to provide users with a comfortable grip on bottle 3 and fit the average human hand, unlike existing reusable water bottles which exhibit a trend of being bulbous, oversized and difficult to drink using one hand.

In one embodiment, bottle 3 has an interior volume of less than 2 liters, or more preferably less than 1.75 liters, or more preferably less than 1.5 liters. In another embodiment, bottle 3 has an interior volume of less than 1.25 liters, or less than 1.0 liters. In another embodiment, bottle 3 has an interior volume of greater than 0.25 liters, or more preferably, greater than 0.5 liters. In another embodiment, bottle 3 has an interior volume of greater than 0.75 L. Bottle 3 may be comprised of any durable material such as plastic, glass, aluminum or steel. In one embodiment, bottle 3 is comprised of 18/8 stainless steel. In one embodiment, bottle 3 is comprised of a non-leachable, durable and reusable material. In some embodiments, bottle 3 is comprised of any thermoplastic, thermoset, bioplastic, biopolymer, Eastman Tritan® Copolyester, polymethylmethacrylate (PMMA), acrylic, polylactic acid (PLA), polyglycolic acid (PGA), polypropylene (PP), polystyrene (PS), polyethylene (PE), low-density polyethylene (LDPE), high density polyethylene (HDPE), polycarbonate, BPA-free polycarbonate, polyethylene terephthalate (PET), polyacrylonitrile butadiene styrene (ABS), polyester, polydimethylsiloxane (PDMS), polysulfone (PES), polysulphone (PSU), polyurethane (PU), polyvinyl chloride (PVC), stainless steel, glass, silica, bio-derived polyethylene, cellulose acetate, cellulose acetate butyrate, cellulose proprionate, ECM biofilm, PHB biocomposite, plastarch, etc. These materials may be manufactured via blow molding, injection molding, injection blow molding, casting, etc. In one embodiment, filtering water bottle 5 is comprised primarily of Eastman Tritan® Copolyester. In one embodiment, bottle 3 is blow molded into the desired shape. In another embodiment, bottle 3 is injection blow molded, stretch blow molded, extrusion blow molded, or injection molded. In another embodiment, bottle 3 is cast or co-molded. In another embodiment, bottle 3 is punch pressed or impact extruded.

In one embodiment, bottle 3 has different interior and exterior compositions. In another embodiment, bottle 3 has an interior coating, and exterior coating, a partial coating, or any combination thereof. In one embodiment, said coating is a powder coating. In one embodiment, bottle 3 has an air gap, a foam, or other insulating material, to insulate bottle 3. In one embodiment, the plastic resin for filtering water bottle 5 is mixed with antimicrobial powder that has been masterbatched into pellet form and the mixture is injection blow molded, stretch blow molded, extrusion blow molded, or injection molded.

In another preferred non-limiting embodiment of the present invention, bottle 3 is comprised of a BPA-free transparent/translucent polymer.

Pelletized Filtration Media

In a non-limiting embodiment of the present invention, filtering media 4 may include pellets ranging in size from approximately 1 mm to approximately 20 mm. In one embodiment, the pellets are enhanced with particulate filtering agents on their surface to bind contaminants and remove them from water passing through the filter. In one embodiment, the agents have a composition as disclosed by Innova Dynamics, Inc. (formerly, Innova Materials, LLC) in PCT Patent Applications WO/2008/150867 and WO/2010/022353, and U.S. Provisional Patent Applications 61/126,589, 61/189,540, and 61/203,661. These pellets may be tailored to target different contaminants present in different water sources.

Sachet Filtration System

In a non-limiting embodiment of this invention, high performance filter media 21 is placed inside sewn or otherwise sealed sachets and are situated inside filter housing 27 surrounded by loose filtration media 4 (e.g., pellets and carbon). Media 4, 21 are designed to target different contaminants present in different water sources. These media include but are not limited to KDF-55, KDF-85, ion exchange media, ion exchange resin, zeolites, activated alumina, mechanical filtration mesh, oxidation media, activated carbon cloth, carbon mesh, carbon screen, carbon padding, carbon fabric, carbon sponge, carbon foam, carbon felt, absorbent media, adsorbent media, catalytic media or the like. The filter segment may emit, release, or dissolve various agents, ions, or chemicals into the filtrate as well. The following are non-limiting examples: electrolytes, energy enhancers, sweeteners, flavorings, scents, antimicrobials, silver based antimicrobials, texture enhancers, water softening ions, sodium ions, potassium ions, hydrogen ions, anions, or the like.

Secondary Bottle Opening

In a non-limiting embodiment of this invention, there may be a second opening in the opposite end of bottle 3 with an opening such as a thread configuration that allows for several cap types to be screwed on, depending on the use. Examples of accessory caps that may be used with such a configuration include a 'sporty cap' for quick release of water, a screw cap for wide-mouth use, and a high performance filter "puck" with or without an orifice for drinking.

Filter "Puck"

In one embodiment, bottle 3 includes filter 2 with a bag or chamber affixed to it which is filled with media. In one embodiment, media 4 is in the form of a replaceable cartridge or puck. This puck may be filled with high performance filtration media, thus allowing for passive, continual filtration while exposed to water contained within the bottle.

Replacement of Modular Filter Assembly

In one embodiment, when a filter 2 or media 4, 21 arrives at the end of its lifetime by becoming saturated with contaminants and can no longer effectively reduce contaminants in filtrate, then replacement filters may be used in a modular fashion. Additional modular filter assemblies may be identical to the initial filter included with the bottle and are screwed onto the bottle body in an essentially identical way.

Drinking Port

A drinking port or straw may be included to provide a more convenient means to drinking water from the water bottle body. A one-way stop valve may be included with the straw, such as a valve activated by mechanical force like that applied with the teeth, lips, or mouth, or a cap that can selectively close or open the plastic or elastomeric straw to control the water flow through the straw. The straw may also be antimicrobial to prevent the growth of odor or discoloration causing microorganisms. In one embodiment, cap 1 is configured to include the port that can be rotated to the open or close position. In another embodiment, the port includes a removable straw.

Visual Indicators of Device Performance

In one embodiment, filtering water bottle 5 includes a visual indicator that signals the performance of the device. Any visual indicator may be attached to filtering water bottle 5 and includes, but is not limited to any mechanical, chemical, biological, optical, or electronic strip or device signaling the lifetime of the filter. As a preferred, non-limiting embodiment, a label may be attached to the bottle dating the starting and ending dates for use of the filter, useful for informing the user the date to change the filter.

Performance

In one embodiment, filter 2 may be designed, by choosing the appropriate filter media 4, media combination, media size, configuration of media, compartmentalization of said media, flow rate, filter shape, etc., to filter influent water to comply with for instance the NSF/ANSI 42 and/or 53 standards. A preferred, non-limiting selection of contaminant concentrations are listed below for influent and filtrates conforming to the NSF/ANSI 42 and 53 standards for drinking water.

| Contaminants | Influent Challenge Concentration. (mg/L) | Maximum ANSI 42/53 Effluent Limits (mg/L) |
|---|---|---|
| Arsenic (5+) (pH 6.5) | 0.05 | 0.010 |
| Arsenic (5+) (pH 8.5) | 0.05 | 0.010 |
| Cadmium | 0.03 | 0.005 |
| Copper | 3.0 | 1.3 |
| Lead (pH 6.5) | 0.15 | 0.01 |
| Lead (pH 8.5) | 0.15 | 0.01 |
| Mercury (pH 6.5) | 0.006 | 0.002 |
| Mercury (pH 8.5) | 0.006 | 0.002 |
| Chloramine | 3.0 | 0.500 |
| Chlorine, residual | 2.0 | ≥50% remaining |
| TSS (Particulates 0.45 um) | 11000 | ≥85% remaining |

In some embodiments, filtering bottle 5 is configured and dimensioned to 1) filter water as water enters the water bottle rather than only upon exit, 2) permit a rapid (in some embodiments bi-directional) gravity flow filtration device, and 3) reduce contaminants present in influent water with relatively high flow rates (e.g., at least at speeds approximate to filling and drinking speeds or approximately 0.5 Lpm to 5 Lpm) and low contact times. In some embodiments, filter water bottle 5, provides for quicker, better-tasting filtered water on-the-go.

Non-Limiting Example

A filter encasing may comprise total 30-100% 4×8 mesh granular activated carbon, 0-30% KDF-55, 0-20% KDF-85, 0-50% weak acid cation exchange resin, 0-50% mixed bed ion exchange resin, 0-50% anion exchange resin, 0-20% iron-based media, 0-30% zeolite, and 1-10% antimicrobial embedded granular media. The KDF-55, KDF-85, ion exchange resins, and zeolite in the aforementioned filter media composition may be enclosed in a water-permeable pouch, sachet, bag, or sock that is strategically placed either in a layer or in a tubular or essentially spherical shape surrounded by activated carbon and other media within the tubular filter encasing. The shape of the pouch, sachet, bag, or sock is configured to balance contaminant remediation efficiency, flow rate, axial flow and radial flow characteristics, etc. The pouch, sachet, bag, or sock, may be a material comprising nylon, a thermoplastic, polypropylene, polyethylene, polyester, cloth, cellulosic material, or the like, and the water permeability is dictated by the porosity of the cloth or membrane.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

We claim:

1. A portable, filter apparatus for treating drinking water, comprising:
a filter housing having a filter chamber containing granular filtration media that comprises granular activated carbon, the filter housing having a reservoir positioned upstream the filter chamber to provide a gravity flow of water through the filter chamber, a venting mesh positioned between a bottom end of the reservoir and a top end of the filter chamber, wherein the venting mesh has a top surface positioned adjacent the reservoir and a bottom surface that retains the granular filtration media within the filter chamber, and a filter pad positioned at a bottom end of the filter housing, wherein the filter pad has a top surface that is adjacent to the granular filtration media and a bottom surface, the filter pad retaining the granular filtration media within the filter chamber, the venting mesh having a porosity that is coarser than a porosity of the filter pad, and wherein said filter apparatus allows for a flow rate of about 0.5 Lpm to about 5 Lpm through the filter chamber when the reservoir is filled with water at atmospheric pressure.

2. The apparatus of claim 1, wherein said filter apparatus allows for bidirectional flow.

3. The apparatus of claim 1 further comprising a cap configured to be placed on an open top of the reservoir to prevent water from escaping the reservoir.

4. The apparatus of claim 3, wherein said cap is sealable to the open top of the reservoir.

5. The apparatus of claim 1 further comprising a portable, personal, reusable bottle body serving as a vessel upon which said filter housing is attached.

6. The apparatus of claim 5, wherein said bottle is configured to match the curvature of the filter housing.

7. The apparatus as claimed in claim 5, further comprising one or more ventilation holes through a wall of the bottle, the ventilation hole(s) configured to permit flow of air from inside the apparatus to outside the apparatus.

8. An apparatus as claimed in claim 1 wherein said filter further includes one or more of the following media: adsorbent media, brass filings, CuZn, ion exchange media, ion exchange resin, zeolites, and activated alumina oxidation media.

9. The apparatus of claim 8, wherein said media is homogeneously mixed.

10. An apparatus as claimed in claim 8, wherein said filter apparatus is configured to reduce contaminants, organic compounds, inorganic compounds, chloramines, chlorine, particulates, arsenic, lead, cadmium, chromium, copper, formazin, pesticides, atrazine, volatile organic compounds, hormones, endocrine disruptors, or heavy metals, from drinking water.

11. An apparatus as claimed in claim 1 wherein said filter includes filtration pellets that are surface-embedded with antimicrobial agents, biocidal agents, silver, titania, zinc, ion exchange media, zeolites, activated alumina, powdered activated carbon, oxidation media, adsorbing agents, absorbing agents, catalytic agents or any combination thereof.

12. An apparatus as claimed in claim 1, wherein said granular filtration media is configured to reduce chlorine at a given flow rate of at least 0.5 Lpm.

13. An apparatus as claimed in claim 1, wherein said granular filtration media is configured to reduce chlorine at a given flow rate of approximately 1.9 Lpm to approximately 2.3 Lpm.

14. The apparatus as claimed in claim 1, wherein said filter apparatus includes a sachet filtration system.

15. The apparatus of claim 1, wherein the venting mesh comprises a mesh with a porosity from approximately 50 μm to approximately 2000 μm.

16. The apparatus as claimed in claim 1, wherein the filter pad comprises a mesh with a porosity from approximately 50 μm to approximately 500 μm.

17. The apparatus as claimed in claim 1, wherein the granular filtration media comprises coarse media having a major dimension in a range from 1.5 mm to 5 mm.

18. The apparatus as claimed in claim 1, wherein the granular filtration media comprises granular or powder activated carbon having a size of at least one of 4×8, 6×12, 8×16, 8×30, and 12×30.

19. A portable, reusable filter apparatus for treating drinking water, comprising:
a bottle having a mouth;
a filter housing having a filter chamber containing granular filtration media, the filter housing being configured to be removably and sealingly attached to the mouth of the bottle, the filter housing having a reservoir positioned upstream of the filter chamber to provide a gravity flow of water through the filter chamber, a venting mesh positioned between a bottom end of the reservoir and a top end of the filter chamber, wherein the venting mesh has a top surface positioned adjacent the reservoir and a bottom surface that retains the granular filtration media within the filter chamber, and a filter pad positioned at a bottom end of the filter housing, wherein the filter pad has a top surface that is adjacent to the granular filtration media and a bottom surface, the filter pad retaining the granular filtration media within the filter chamber, the venting mesh having a porosity that is coarser than a porosity of the filter pad, and wherein said filter apparatus allows for a flow rate of about 0.5 Lpm to about 5 Lpm through the filter chamber and into the bottle when the reservoir is filled with water at atmospheric pressure; and
a cap configured to sealingly close the reservoir of the filter housing.

20. The apparatus as claimed in claim 19, wherein the filter housing and the bottle are threadably attached.

21. The apparatus as claimed in claim 20, wherein the cap and the filter housing are threadably attached.

22. The apparatus as claimed in claim 19, wherein the filter apparatus is configured to filter water entering and exiting the bottle when the filter housing is attached to the bottle.

23. The apparatus as claimed in claim 19, wherein the granular filtration media comprises granular activated carbon.

24. A portable, reusable filter apparatus for treating drinking water, comprising:
a bottle having a mouth; and
a filter housing configured to be attached to the bottle, the filter housing having a filter chamber containing granular filtration media, the filter housing having a reservoir positioned upstream of the filter chamber to provide a gravity flow of water through the filter chamber, a venting mesh positioned between a bottom end of the reservoir and a top end of the filter chamber, wherein the venting mesh has a top surface positioned adjacent the reservoir and a bottom surface that retains the granular filtration media within the filter chamber, and a filter pad positioned at a bottom end of the filter housing, wherein the filter pad has a to surface that is adjacent to the granular filtration media and a bottom surface, the filter pad retaining the granular filtration media within the filter chamber, the venting mesh having a porosity that is coarser than a porosity of the filter pad, and wherein said filter apparatus allows for a flow rate of at least about 0.5 Lpm through the filter chamber and into the bottle when the reservoir is filled with water at atmospheric pressure.

25. The apparatus as claimed in claim 24, wherein the granular filtration media comprises granular activated carbon.

26. The apparatus as claimed in claim 24, further comprising a cap configured to close an open to of the reservoir of the filter housing.

27. The apparatus as claimed in claim 24, wherein the filter housing is configured to reduce chlorine as water passes through the water filter and into the bottle at a flow rate from about 0.5 Lpm to about 5 Lpm.

* * * * *